XR 3,739,088

United States Patent [19]

Landsman

[11] 3,739,088

[45] June 12, 1973

[54] PRINTING PLATE PRODUCTION METHOD AND APPARATUS

[75] Inventor: Robert M. Landsman, Norwalk, Conn.

[73] Assignee: The Perkin-Elmer Corporation, Norwalk, Conn.

[22] Filed: May 20, 1971

[21] Appl. No.: 145,187

[52] U.S. Cl......... 178/6.6 TP, 101/467, 178/6.6 B, 178/6.7 R, 250/65 T, 340/173 TP, 346/76 L, 346/77 E

[51] Int. Cl......................... G01d 15/14, H04n 1/24

[58] Field of Search................ 101/467; 178/6.7 R, 178/6.6 B, 6.6 TP; 340/173 TP; 250/65 T; 346/77 E, 76 L

[56] References Cited

UNITED STATES PATENTS

| | | | |
|---|---|---|---|
| 3,181,170 | 4/1965 | Akin | 178/6.6 B |
| 3,316,348 | 4/1967 | Hufnagel | 178/6.7 R |
| 3,019,292 | 1/1962 | John | 178/6.7 R |
| 3,398,237 | 8/1968 | Paidosh | 178/6.6 B |
| 3,266,045 | 8/1966 | Schaffert | 340/173 TP |

*Primary Examiner*—Howard W. Britton
*Attorney*—Edward R. Hyde, Jr.

[57] ABSTRACT

A relief printing plate is formed by providing a sheet of material that collapses within its own volume by application to a surface of the sheet of a particular type of radiant energy, such as infrared radiation, this surface of the sheet being covered by a film of material which reflects said radiation. A relief pattern is formed by vaporizing selected areas of the reflective film to uncover underlying areas of the sheet so that the unvaporized reflective film forms a reflective template of the pattern to be in relief, and thereafter aupplying the radiation to the surface to collapse the uncovered areas of the sheet and leave in relief the areas shielded by the reflective template. In a preferred form the reflective film is initially covered by a layer of material that absorbs sufficient heat from a beam of another type of radiant energy to vaporize the reflective film immediately underlying a spot on the absorbent layer heated by the beam. A paste-up or other graphic representation of material to be reproduced in relief is scanned to produce electric signals corresponding to contrasts in the scanned material and the signals are applied to modulate a beam of radiant energy, which is scanned over the absorbent layer in synchronism with the scanning of the graphic representation, so that the beam heats selected areas of the absorbent film to vaporize underlying areas of the reflective film in a pattern such that the unvaporized reflective film is in a pattern corresponding to the pattern to be reproduced in relief.

3 Claims, 6 Drawing Figures

PATENTED JUN 12 1973

3,739,088

INVENTOR
Robert M. Landsman

BY John K. Conant

ATTORNEY

PRINTING PLATE PRODUCTION METHOD AND APPARATUS

The present invention relates to relief printing plates for letterpress or letterset printing and particularly to a method and apparatus for processing a novel printing plate blank to produce a plate adapted to be used in conventional letterpress or letterset printing apparatus.

A principal object of the present invention is to provide a method and apparatus for producing a relief printing plate, which is adapted for use with conventional letterpress or letterset printing apparatus of the type currently in general use for printing newspapers, books and the like, more inexpensively and faster than conventional letterpress or letterset printing plates have been, or are capable of being made.

Another object is to provide a method and apparatus for producing a letterpress or letterset relief printing plate at least comparable to currently used letterpress and letterset printing plates in that the printing plate produced can be provided with a relief pattern of up to about 0.020 of an inch high so as to assure clean, sharply defined copies, and will be capable of printing at least about 70,000 copies.

At present letterpress and letterset printing plates are customarily cast. The written material is prepared with a Linotype machine and is assembled, together with any half tone engravings to be included, in a chase to provide a page form. After a proof copy is made from the page form and suitable corrections made, a sterotype mat is made from the page form and this mat is used in a special casting machine for casting the printing plate in lead. This is complicated and expensive and a great deal of effort has been applied to try to find some alternative method for forming satisfactory printing plates.

It has been proposed for example to form a printing plate by using a laser beam or an electron beam for etching a plastic plate, the etching being performed under the control of a computer program for the material to be etched or by scanning a paste-up of the material to be etched and actuating the etching mechanism in correspondence with the pattern of letters and engravings on the paste-up. At present, however, this method is not feasible since there are no currently available laser or electron beam apparatus having sufficient power for etching known plastics to the required depth in a sufficient short time to be practical and economical. For example, it is estimated that to etch a surface 18 × 24 inches to a detph of 0.020 inch for an average amount of printed material in not more than about 2 minutes would require a laser system capable of delivering about 5,000 watts of energy to the plate safely and with the required resolution and is not feasible with currently available or projected equipment.

It has also been proposed to use an ultraviolet laser for polymerizing a photopolymer plate as a means of photopolymerizing selected areas of a suitable plastic material to provide the desired relief, but careful consideration of the materials and equipment required indicates that the processing time and cost would be greater than with currently used materials and methods.

The method and apparatus of the present invention is particularly adapted for processing a particular one of the forms of printing plate blanks disclosed in copending U.S. patent application Ser. No. 145,315 filed May 20, 1971 for "Radiation Etchable Plate." As described therein the subject plate blank consists of a sheet of thermoplastic material that collapses within its own volume when heated to its softening temperature by a specific type of radiant energy, such as infrared radiation. The surface of the thermoplastic sheet is initially covered by a film of material that reflects the specific type of radiation to be applied for collapsing selected areas of the sheet. The reflective film in turn is covered with a film of material that absorbs sufficient heat from a beam of radiant energy to vaporize, and thus remove, underlying areas of the reflective film. Thus by applying a beam of radiant energy to remove areas of the reflective film in a pattern conforming to the material it is desired to have in relief and by removing remnants of the absorbent film from the portions of reflective film that are left, radiant energy applied to the plate will then collapse the areas of the thermosplastic sheet from which the reflective film has been removed and leave in relief the areas shielded by the reflective film.

In accordance with the present invention a paste-up or other graphic representation of material to be reproduced in relief on the printing plate is scanned in a raster pattern by a beam of light from a laser and the reflected light is sensed to produce electric signals representing relatively light and dark areas in the scan path. The absorbent film of the printing plate blank is scanned by another laser beam in synchronism with the scanning of the graphic representation by the first laser, and in a corresponding pattern, and the signals produced by the reflections of the first laser beam from the graphic representation are applied to modulate the beam from the second laser to selectively heat areas of the absorbent film for vaporizing, and thus removing the underlying areas of the reflective film on the plate blank in a pattern conforming to the pattern of the graphic representation.

When the scanning is completed, the remaining portions of absorbent film are wiped off the plate to uncover the areas of reflective film which have not been removed from the plate and which define the areas that are to be left in relief. The removal of selected areas of the reflective film in the above manner uncovers the underlying sheet of thermoplastic material at these areas. Then the type of radiant energy which will soften and collapse the thermoplastic material is applied to the plate to soften and collapse the uncovered areas of the thermoplastic sheet and thus leave in relief the areas of the plate surface that are still covered by areas of the reflective film which reflect the radiant energy.

Further objects, advantages and features of this invention will be apparent from the following more detailed description of an illustrative embodiment which is described with reference to the accompanying drawings in which.

Figure 1:
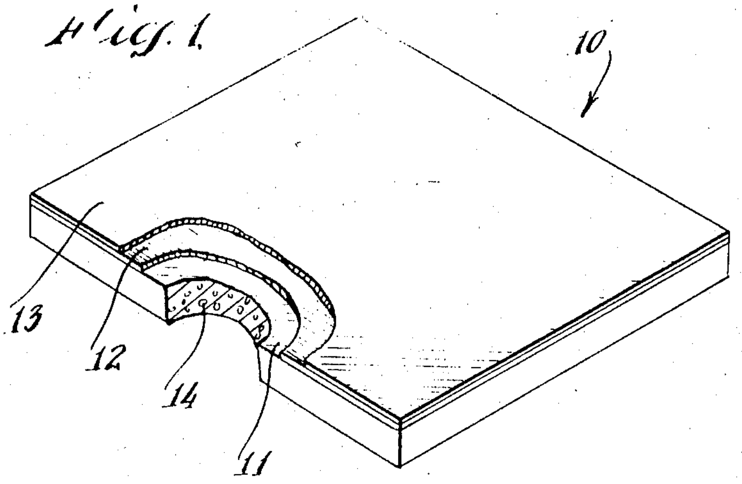
FIG. 1 is a perspective view of a type of printing plate blank that the method and apparatus of this invention is adapted to process to provide a relief printing plate.
Figure 3:
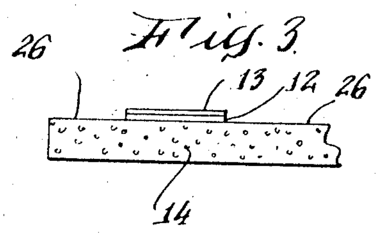
Figure 4:
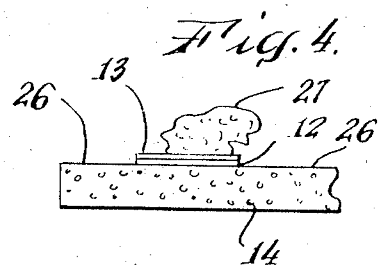
Figures 5, 6:
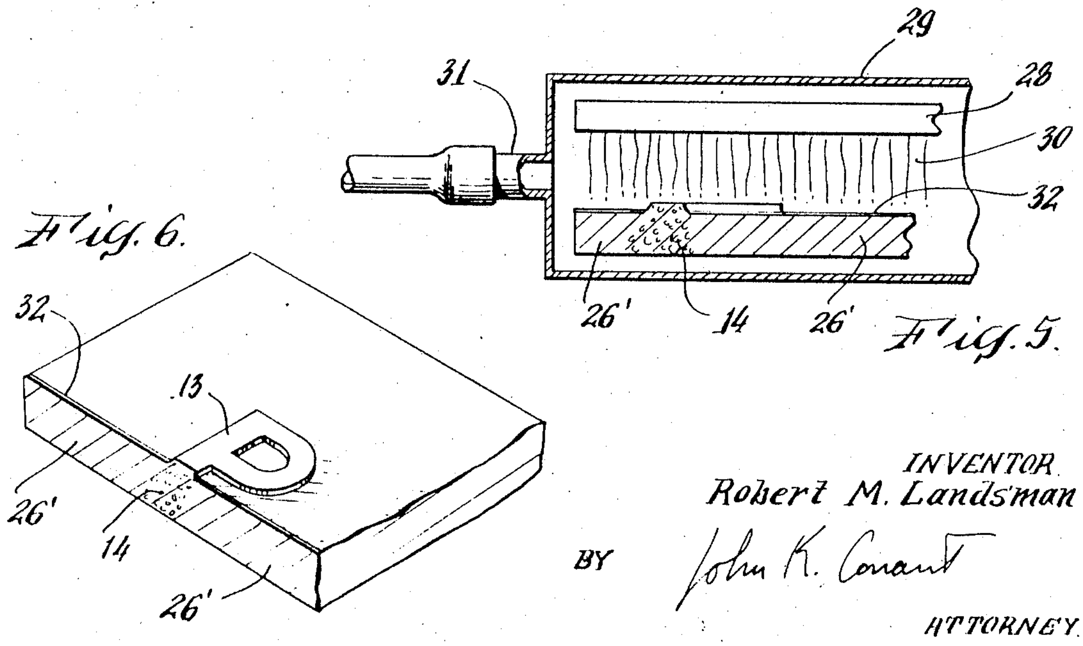

FIGS. 3, 4 and 5 are similar, enlarged cross-sectional views vertically through a portion of a printing plate blank of FIG. 1 illustrating the first, second and last steps in accordance with the invention for producing a printing plate on which a particular pattern of material to be printed is reproduced in relief; and FIG. 6 is a perspective view of the printing plate portion illustrated in FIG. 5, showing it after the completion of the last, relief forming, step.

Referring to the drawings, FIG. 1 shows a printing plate blank 10 adapted to have a desired relief pattern formed thereon by the method and apparatus of this invention. This plate blank 10 is one of the forms of plate blanks disclosed in the above-mentioned copending U.S. patent application for "Radiation Etchable Plate." It consists of a sheet 11 of a thermoplastic material which collapses within its own volume when heated to its softening temperature by a particular type of radiant energy, such as infrared radiation. The surface of the sheet 11 on which the relief pattern is to be formed is covered with a film 12 of material which reflects the type of radiant energy that is to be applied to collapse the sheet 11, and the film 12 is in turn covered by a layer or film 13 of material which absorbs sufficient heat from a beam of radiant energy, such as a beam of coherent light from a laser, to heat and vaporize the underlying area of the reflective film 12 as means for removing selected areas of the reflective film 12.

The general method of this invention consists in applying a beam of radiant energy to the absorbent film 13 for vaporizing, and thus removing, areas of the reflective film 12 in a desired pattern so that the remaining reflective film 12 on the sheet 11 provide a reflective template defining the pattern to be left in relief. Thereafter radiant energy applied to the sheet collapses the uncovered areas and leaves in releif the areas covered by the template of reflective film, which reflects the radiant energy and thereby shields the underlying areas of the sheet from the effect of the radiant energy.

The sheet 11 is suitably a thermoplastic synthetic resin plastic such as nylon, polyethylene, polypropylene or urethane, and has a multiplicity of small closely spaced voids 14 dispersed uniformly throughout it. The voids 14 may be either open cell pores or bubbles. The smaller the voids, and the more closely they are spaced, the sharper will be the definition of the relief pattern formed. In practice, the voids 14 of substantially uniform side —about 0.0003 of an inch or smaller, and preferably about 0.0001 of an inch, in diameter— uniformly and closely spaced throughout the material so that about 15 to 70 percent, and preferably about 50 percent, of the volume of the sheet 11 is voids, provides a relief pattern which will more than satisfy current standards of definition and durability for quality book printing.

A sheet 11 incorporating voids of the desired size and quantity may be formed by sintering particles of suitable thermoplastic material into a coherent porous mass, or by working granules of soluble material, such as sodium chloride, into the thermoplastic material and then leaching out the soluble material. Nylon in which the desired voids 14 are formed by one of the methods mentioned or by any other method capable of producing such voids, provides a suitable sheet 11 for the practice of this invention. It is heat softenable (i.e., its surface tension is reduced, sufficiently to collapse within its own volume by sinking into the voids) by applying infrared radiation which has a wavelength band of from 1 to 6 microns and a black body temperature of about 600° C, to the surface of the sheet for from about 2 to about 15 seconds, depending on the temperature of the material when the radiation is applied. The time may be reduced to the lower limit by preheating the material to a temperature approaching its softening temperature in any suitable manner, such as by blowing warm air over it or by placing it in a heated chamber for a brief time. This improves the sharpness or resolution of the relief. In addition the amount of the relief is increased, and the complete collapse of the material and the elimination of residual bubbles is facilitated, by placing the sheet 11 in a partial vacuum during the irradiation.

The reflective film 12 may be a thin film of any suitable material which reflects the type of radiation to be applied to collapse the sheet 11. Specifically, the criteria for the reflective film 12 are, (1) that it must reflect the radiant energy applied to soften exposed portions of the sheet 11 so that the portions of the sheet 11 which are immediately below and thus shielded by the reflective film will not be softened to the collapsing point and (2) that it must be sufficiently thin or of such composition that selected, well defined areas of it are vaporized and pass off before the heat applied for vaporizing it heats the underlying material of sheet 11 to the softening point. Suitable materials for the reflective film 12, for reflecting infrared radiation, are aluminum, bismuth, cadmium, silver, gold and zinc. A thin film of aluminum on the order of about 1 micro inch thick, which may be coated on a nylon sheet 11 by vacuum deposition, provides a particularly suitable reflective film 12.

The absorbent film 13 may be a layer or film of any material which satisfies the criteria, (1) that in a very brief exposure, it absorbs sufficient heat from a beam of radiant energy in a small, concentrated area to vaporize the immediately underlying area of the reflective film 12, and (2) that it is easily removable from remaining areas of the reflective film 12 which are not vaporized. A film of carbon or graphite on the order of 1 micro inch thick, which may be applied in any well known manner, such as by dip coating or granure printing, is particularly suitable over a reflective film 12 of aluminum about 1 micro inch thick, and will absorb sufficient heat from a laser beam having a wavelength of about 1 micron for vaporizing selected areas of the underlying reflective film in the desired manner. A YAG (yettrium aluminum garnet) laser is particularly suited for this purpose. After the vaporizing step, carbon or graphite covering the areas of reflective film 12 that are left on the sheet is easily removed by wiping with alcohol.

Figure 2:
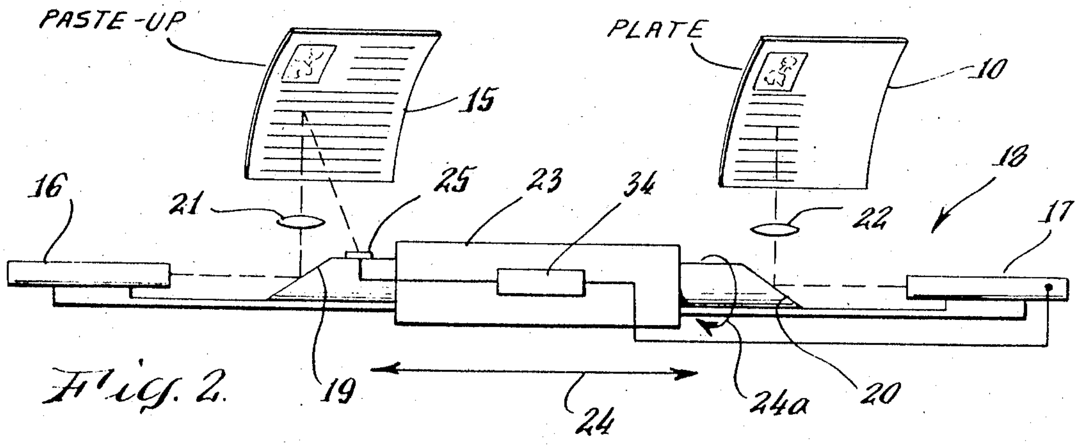
FIG. 2 is a schematic illustration of apparatus for performing the first stage in the preparation of a printing plate in accordance with the invention.

FIG. 2 illustrates the method steps of this invention, and apparatus for performing them, by which areas of the reflective film 12 are removed from the sheet 11 in a pattern such that the areas of reflective film 12 left on the sheet 11 define a template conforming to the information on a paste-up 15, or other graphic representation of material, that is to be reproduced in relief on the sheet 11.

The paste-up 15 is scanned by a laser 16 to produce signals that are applied to modulate the beam from a second laser 17 which is arranged to scan the plate 10 in synchronism with the scanning of the paste-up, and in a corresponding scan path. The signals vary in accordance with the relative lightness or darkness of successive portions of the paste-up surface scanned by the laser 16 and are connected to modulate the beam of laser 17 between a low intensity at which it has no effect on the plate 10 and a high intensity at which it heats a small spot of the absorbent film 13 sufficiently to vaporize the underlying portion of the reflective film 12. Thus the reflective film 12 is removed from the plate 10 in a pattern which corresponds either to the highlight or to the background of the material on the paste-up 15 depending on the way in which the signals are applied to modulate the beam of laser 17. For producing the usual printing plate the connections will be arranged so that signals representing the background of the material on the paste-up 15 will modulate the laser 17 beam to the higher intensity so that the reflective film 12 left on the plate 10 forms a reflective template pattern corresponding to the letters and designs appearing on the paste-up. In the drawing the material represented on the paste-up 15 is indicated as being lines of copy and a half-tone picture as on a conventional newspaper or book page.

In the apparatus illustrated in FIG. 2 the paste-up 15 and plate 10 are supported in curved condition concentrically relative to the axis of an elongated rotating double scanning assembly 18. The lasers 16 and 17 are carried on opposite ends of the rotating assembly 18 for their beams to be deflected by angular mirrors 19 and 20 through focussing lenses 21 and 22 to impinge respectively on the paste-up 15 and the plate 10.

The assembly 18 is rotated by drive mechanism indicated at 23 and is simultaneously moved axially as indicated by the arrow **24*a* and 24*b* by suitable translational drive means such as a linear induction motor so that lasers 16 and 17 scan along a spiral path. The entire scanning assembly 18** is suitably mounted on an air bearing cross member with suitable connections made to a source of electric power.

The beam from the laser 16 as focussed on the paste-up 15 by the lens 21 is reflected back to a detector 25 which converts the reflected light of the beam into electric signals whose intensities are proportional to the intensity of the reflected light received. The detector 25 is suitably a photomultiplier, or photodiode, and is connected to actuate a modulator 34. The modulator 34 is connected to modulate the intensity of the beam from the laser 17 in proportion to the intensity of the signals received from the detector 25 for reproducing a reflective template on the plate 10 corresponding to the material represented on the paste-up 15 as described above.

The laser 16 is suitably a neon helium laser which has an operating wavelength of 0.6328 microns, and the lens 21 is selected to focus the beam from laser 16 into a spot of about 0.001 of an inch in diameter on the paste-up 15.

A suitable laser 17 for producing a beam to heat selected areas of a carbon or graphite absorbent film 13 and vaporize the underlying areas of a thin aluminum reflective film 12 is a YAG laser which produces a beam of light having a wavelength of about 1.06 microns.

In order for half-tones, provided by conventional half-tone spots on the paste-up 15, accurately reproduced by a printing plate formed in accordance with this invention, it is believed the individual spots of the reflective film 12 vaporized and removed by the beam from the laser 17 should be 5 to 10 times smaller than the conventional half-tone spot in order to minimize moire effects and to accurately reproduce highlight detail. In practice, with a plate 10 having an aluminum reflective film 12 about 1 micro inch thick covered with an absorbent film 13 of carbon or graphite about 1 micro inch thick, the desired accuracy is provided by a YAG laser in combination with a lens 22 for focussing the laser beam into a spot about 0.001 of an inch in diameter.

FIG. 3 is a cross section through a plate 10 after selected areas of the reflective film 12 have been vaporized, and thus removed by the operation of the laser 17. As the selected areas of the reflective film 12 are vaporized, the overlaying areas of the absorbent film 13 which are heated to produce the vaporization are carried off with the vapors so that the underlying surface areas of the thermoplastic sheet 11 are uncovered as indicated at 26. The areas of reflective film 12 left on the sheet 11, to form a reflective template thereon, are still coated with absorbent film 13, which is then wiped off with a suitable solvent. As indicated in FIG. 4 the remaining absorbent film 13 may be removed by wiping with sponge 27 saturated with alcohol.

After the desired reflective template pattern of reflective film 12 has been formed on the plate 10, by the operation of the apparatus of FIG. 2, the plate is removed from the apparatus and the remaining absorbent film 13 is wiped off in preparation for the relief forming step by the application of radiant energy which collapses the uncovered portions 26 of the sheet 11.

FIG. 5 illustrates appropriate apparatus for carrying out the final relief-forming step. The plate 10 on which the template of reflective film 12 has been formed and from which the excess absorbent film 13 has been wiped is placed under an infrared panel lamp element 28 in a vacuum chamber 29. The infrared panel lamp element 28 is of a conventional type for producing infrared radiation over an area, indicated at 30, coextensive with the area of the plate surface to be irradiated. The infrared radiation provided suitably has a wavelength band of from 1 to 6 microns and a black body temperature of about 600° C. A partial vacuum, the amount of which is not critical, is created in the chamber 29 by a conventional pump (not shown) connected to the chamber outlet 31, and the lamp element 28 is turned on long enough — from about 2 to about 15 seconds — for the uncovered areas 26 of the sheet 11 to be softened and collapse, the collapsed portions being indicated at 26' in FIGS. 5 and 6.

The time required to heat the uncovered portions of the sheet 11 to the softening point may be reduced by the sheet to a temperature approaching its softening temperature in any suitable manner, such as by blowing warm air over it or by placing it in a heated chamber for a brief time. This also improves the quality of the relief.

Irradiation of the sheet 11 in a partial vacuum is not essential, the sheet will usually collapse an acceptable amount at atmospheric pressure, but irradiation in a partial vacuum reduces the period of exposure to radiation required, increases the amount of relief and facilitates uniform and complete collapse of the material into the voids 14.

FIGS. 5 and 6 show in cross section the appearance of the collapsed and of the relief portions of the plate 10 after irradiation. The collapsed portions 26' are solid while the portions shielded by the reflective template pattern, illustrated by a template of reflective film 12 in the form of a letter P on the sheet 11, still contain voids 14 and are substantially their original thickness.

The softening of the sheet to collapse it by irradiation in the above manner results in a skin 32 over the collapsed areas 26' which seals the surface even though there may be small pores left in the interior of the collapsed regions. Thus, if the voids 14 are open cell pores interconnected through the sheet 11, it would be possible to utilize a plate of this invention, having a relief pattern formed thereon as above, in a silk screen form of reproduction processing. For this purpose the remaining reflective film 12 forming the reflective template pattern would be removed from the relief portions so that ink squeezed onto the back of the plate 10 (i.e., the underside in FIG. 6) would pass through the open cell pore structure at the relief portions of the plate but could not pass through the substantially solid collapsed portions, for even if there were some minute passages through the collapsed portions, these would be closed off by the skin 32.

A plate blank 10 processed in the manner described will provide a relief plate in the general form illustrated in FIG. 6 which is adapted to be used with conventional letterpress and letterset apparatus and provides a printing plate that compares favorably with printing plates currently used for commercial newspaper and book printing. That is a printing plate in accordance with this invention is adapted for printing in excess of 70,000 clear, well defined copies of the types of material conventionally reproduced by letterpress and letterset printing, including the various type faces and styles, the forms of half-tone illustrations and line drawings customarily reproduced in newspapers and books.

What is claimed is:

1. A method of forming a relief printing plate having a desired relief pattern thereon comprising the steps of:

providing a sheet of thermoplastic material that is collapsible within its own volume by application of a first type of radiant energy to a surface thereof, said surface being covered by a film of material that reflects said first type of radiant energy;

providing over the reflective film on said sheet a layer of a material that absorbs sufficient heat from a beam of a second type of radiant energy to vaporize the reflective film in the area immediately underlying a spot on the absorbent layer that is heated by said beam;

preparing a graphic representation of material to be reproduced in relief on said sheet;

scanning said representation with means for producing signals proportional to the contrasts in the representation;

scanning said absorbent layer on the sheet with a beam of said second type of radiant energy that is adapted for heating areas of the absorbent layer to vaporize underlying areas of the reflective film and scanning said absorbent layer in a path corresponding to the path of the scanning of the representation and in synchronism therewith;

applying said signals to modulate the intensity of said beam for heating areas of the absorbent layer to vaporize underlying areas of the reflective film in a pattern such that unvaporized reflective film is in a pattern corresponding to the pattern of relief to be formed;

removing remaining areas of the absorbent film from the unvaporized reflective film prior to the application of said first type of radiant energy; and applying said first type of radiant energy to said surface until the uncovered areas of the sheet collapse below their original surface level leaving the areas that are covered by said reflective film in relief relative thereto.

2. The method of claim 1 which includes scanning said graphic representation with a neon helium laser, focussing the beam therefrom on said representation, detecting light from laser beam reflected from said representation, and converting said reflected light into signals proportional to the contrasts in said representation.

3. The method of claim 1 in which said beam of said second type of radiant energy applied for scanning said absorbent layer is the beam of a YAG laser.

* * * * *